No. 896,102. PATENTED AUG. 18, 1908.
S. G. GILLELAND.
BALING PRESS.
APPLICATION FILED OCT. 23, 1907.
2 SHEETS—SHEET 2.
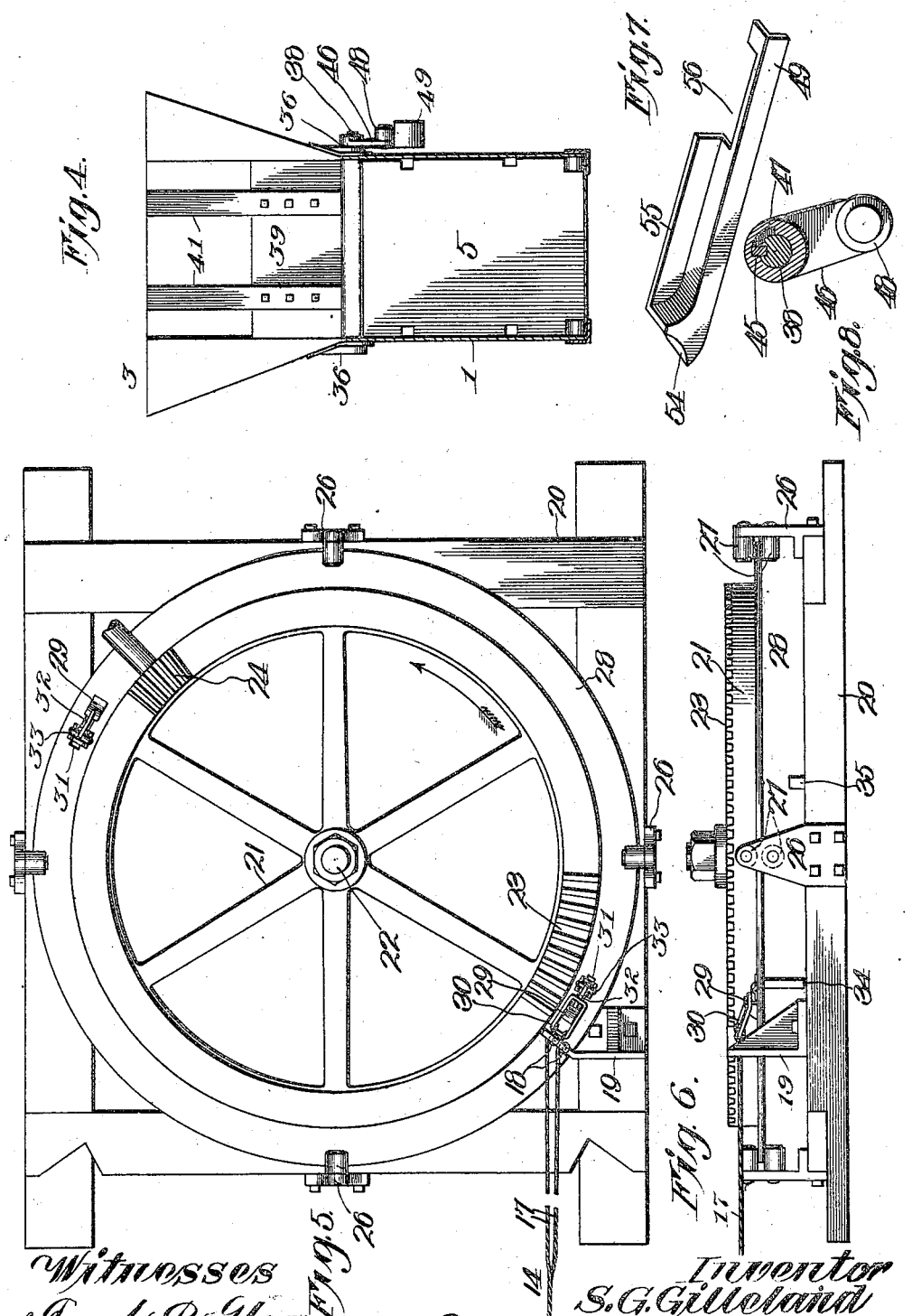

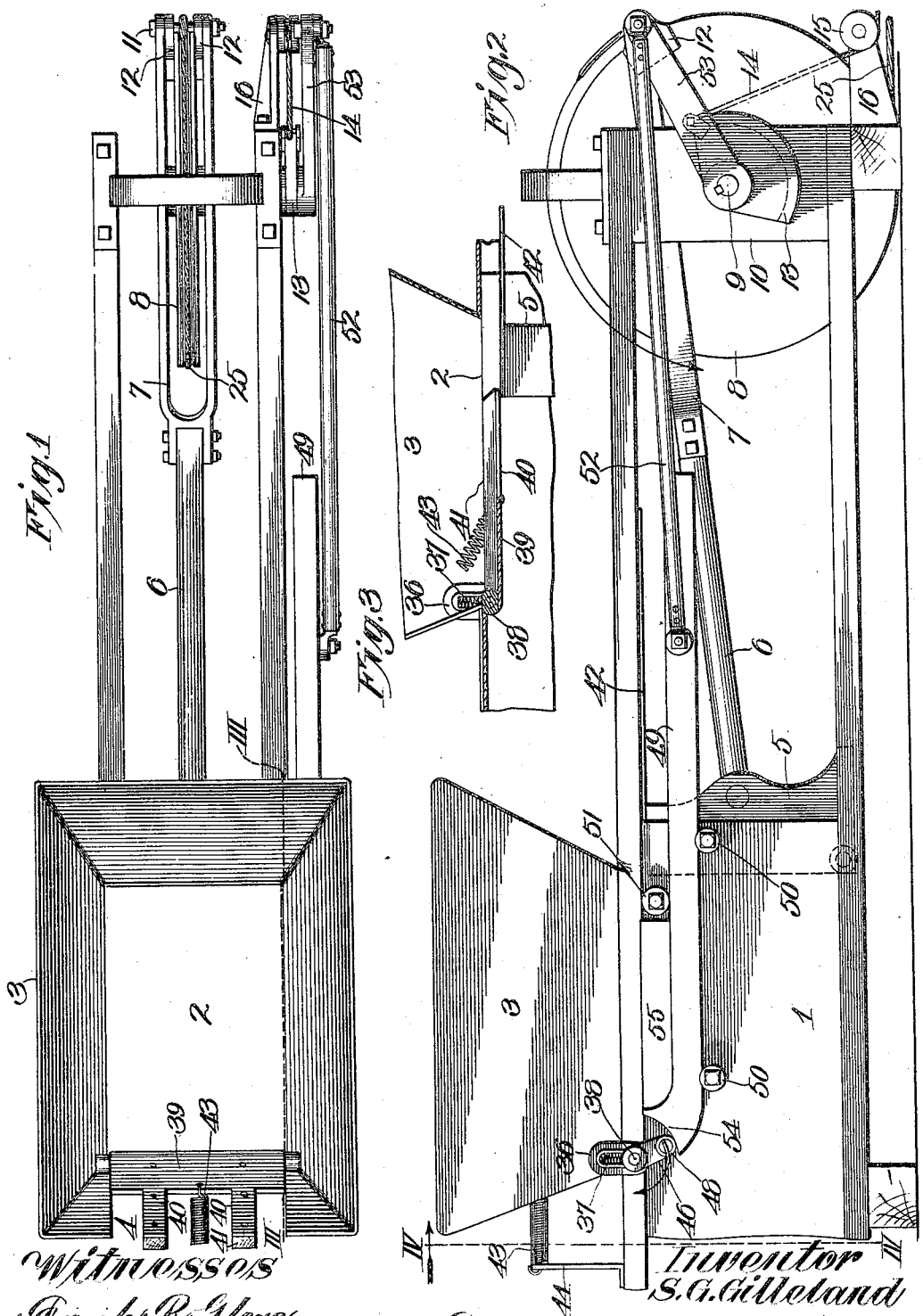

UNITED STATES PATENT OFFICE.

SAMUEL G. GILLELAND, OF SPRING GARDEN, MISSOURI.

BALING-PRESS.

No. 896,102.　　　Specification of Letters Patent.　　　Patented Aug. 18, 1908.

Application filed October 23, 1907.　Serial No. 398,853.

*To all whom it may concern:*

Be it known that I, SAMUEL G. GILLELAND, a citizen of the United States, residing at Spring Garden, in the county of Miller and State of Missouri, have invented certain new and useful Improvements in Baling-Presses, of which the following is a specification.

This invention relates to baling presses, and my object is to produce a machine of this character equipped with means for automatically forcing the baling material from the hopper into the baling chamber and for folding the loose ends of the material at the rear end of the bales.

A further object is to produce means for efficiently and reliably withdrawing the baling plunger to its initial position in the event that it should stick in the baling chamber.

With these general objects in view and others as hereinafter appear, the invention consists in certain novel and peculiar features of construction and organization as hereinafter described and claimed; and in order that it may be fully understood reference is to be had to the accompanying drawings, in which—

Figure 1, is a plan view of the baling case of a baling press equipped with a self feed mechanism embodying my invention. Fig. 2, is a side elevation of the same. Fig. 3, is a vertical section on the line III—III of Fig. 1. Fig. 4, is a vertical section taken on the line IV—IV of Fig. 2. Fig. 5, is a plan view of the power end of the press equipped with means for effecting the recoil of the plunger and the return of the feeder operating mechanism to position for again operating the feeder. Fig. 6, is a side view of the construction embodied in Fig. 5. Fig. 7, is a detail perspective view of a part of the feeder-operating plunger. Fig. 8, is an enlarged vertical section showing the crank arm of the feeder capable of swinging in one direction independent of the feeder shaft to permit the feeder operating plunger to return to its initial position.

In the said drawings, 1 indicates the baling case of a press provided with a feed opening 2, in its upper side and with a hopper 3 having its rear wall vertically slotted for its full height to provide the opening 4 hereinafter referred to.

5 is the usual or any preferred type of plunger for operation in the baling case and 6 the plunger bar terminating in a fork 7 at its front end to receive the grooved wheel 8 mounted on a shaft 9 journaled in standards 10 at the front end of the baling case, the front end of the arms of the fork being pivotally connected by bolt 11, carried by lugs 12 projecting from wheel 8.

13 is a grooved segment secured rigidly on shaft 9 and 14 is a cable secured peripherally to said segment and engaging and underlying a grooved guide roller 15 carried by a bracket 16 projecting from the baling case structure. From roller 15 the cable extends toward the power end of the press and at such end terminates in branches 17 engaging anti-friction rollers 18, mounted in a bracket 19 secured on the framework 20 of the power end of the press.

21 is a horizontally arranged wheel adapted to turn with or upon shaft 22. In the event that the machine is operated by an engine it will be in the form of a gear wheel with its teeth 23 preferably disposed upward and adapted for engagement by a driving pinion 24. In the event that the operation is by horse power, said wheel will be provided with a sweep, not shown, whereby it will be turned. The wheel or shaft will also be equipped with any suitable means, not shown, for alternately pulling forwardly on and releasing the cable 25, engaging wheel 8 and attached at its rear end to bolt 11, as shown in Fig. 1, which means as it forms no part of the present invention has been omitted from this application, it being apparent that each time said cable is drawn forwardly it rotates wheel 8 in the direction indicated by the arrow and causes the plunger 5 to make the compression stroke. The head of the arrow in Fig. 2 indicates the preferred point which the front end of the bar or beam 6 attains at the end of such power stroke, and as it attains such point, the cable 25 is released to permit the plunger to be withdrawn as hereinafter explained, to its original position.

The framework 20, Figs. 5 and 6, is equipped with brackets 26 provided with rollers 27 for engagement with a horizontal annular flange 28 projecting from wheel 21, to prevent any tilting thereof.

29 indicates a pair of diametrically opposite teeth projecting upward from flange 28 of wheel 21 for alternate engagement with a loop 30 secured to the front end of the branches 17 of cable 14 at the front side of bracket 19 so that said bracket shall limit the rearward movement of said loop and in connection with said branched cables hold it in position for successive engagement by said teeth. Just forward (with respect to the direction of rotation of the wheel) of the abrupt face of each tooth 29, the flange 28 is provided with a slot 31 occupied by the horizontal arm 32 of an angle lever pivoted at 33 to said flange, the other arm 34 of the angle lever depending so as to strike the lug or pin 35 projecting upward from frame 20, said engagement operating the angle lever and causing its arm 32 to rise and force the loop 30 upward and trip it from engagement with tooth 29.

Referring now to the baling case end of the press, 36 indicates a pair of vertically slotted brackets secured to the side walls of the hopper at its rear lower corners and 37 a pair of springs secured to said brackets and holding downward therein a transverse shaft 38 journaled in the brackets. To this shaft is rigidly secured in any suitable manner the feeder, preferably consisting of a plate 39 having arms 40 and strengthened or stiffened by a pair of bars 41 secured to said arms and plate in any suitable manner, the arrangement of the feeder being such that when it is swung downward to its horizontal position as shown in Fig. 3, it depends through opening 2, to about the plane of the upper surface of the plunger 5, and the customary apron 42 projecting forwardly therefrom. To reëlevate the feeder it is connected by a retractile spring 43 to a bracket 44 secured to the baling case in any suitable manner, though it is obvious that the reëlevating spring may be otherwise arranged to accomplish the same purpose. Secured to one end of the feeder shaft 38 is a key 45, and journaled upon said shaft is a crank arm 46 provided with a slot 47 to engage the key for a purpose hereinafter explained, and the crank arm is provided at its free end with a roller 48.

49 indicates a reciprocatory bar supported at the side of the baling case occupied by crank arm 46 by and between anti-friction guide rollers 50 and 51, the former at least being of the grooved type to prevent lateral movement of said bar, which by preference is of angle iron to insure the requisite rigidity without undue weight and said bar is pivotally connected by a link 52 to the outer end of a crank arm 53 secured to shaft 9 outward by preference of segment 13, so that said bar shall reciprocate in unison with the plunger. At its rear end the bar has a curved cam end 54, the same curving about concentrically of the feeder shaft when the bar 49 is totally withdrawn. Said bar is also provided at its inner edge with an upwardly projecting rib 55 terminating at the rear end of the slot 56 in the inner edge of the bar, as shown in Fig. 7.

In practice the parts initially occupy the position shown most clearly in Fig. 2, so that when the operation of the machine is started, cable 25 will start the plunger rearward on its compression stroke, and incidentally start the reciprocatory bar 49 in the same direction, the curved cam surface 54 of said bar by pressure on roller 48 swinging the feeder down so as to compress the baling material, not shown, in the hopper down into the baling chamber. In this operation the roller gradually rides upward on cam surface 54, and at the same time is pushed in the direction indicated by the contiguous arrow, Fig. 2, the cam surface consequently insuring a longer movement of bar 49 to effect the depression of the feeder than would be the case if the rear end of said bar was abrupt instead of in the form of a cam. By the time roller 48 attains a position upon rib 55 the feeder is depressed to the position shown in Fig. 3 and the plunger has also attained the position shown in Fig. 3 so as to prevent any possibility of the feeder moving down into the baling case to a position where it would be struck by the plunger. The movement of the plunger continues after the feeder has forced the baling material into the case ahead of it and the feeder is held depressed to prevent the baling material bulging up through the feed opening under the pressure of the plunger, until the latter has reached the rear end of the feed opening. As this position is attained by the plunger rib 55 passes roller 48, and permits spring 43 to instantly reëlevate the feeder and permit the attendant to begin depositing a new charge of baling material into the hopper, the crank arm 46 swinging down through slot 56 in the inner edge of bar 49. As the power stroke of the plunger is completed, the loop 30 is engaged by one of the teeth 29 and is pulled forwardly thereby, this forward pull thus applied on cable 14 reversing the rotation of shaft 9 so as to withdraw the plunger and bar 49 toward their original positions. In such movement the front end of rib 55 strikes roller 48, and swings the same upward without affecting the position of the feeder, said arm swinging upwardly sufficiently high to accommodate the forward movement of the rib because of the slot 47 receiving rib 45 (see Fig. 8). As soon as bar 49 is withdrawn to its initial position the swing arm drops down to its original position so as to be ready for the next power movement of the feeder and bar 49, it being understood that as such crank arm thus drops to its original position the lug 35 operates angle lever 34 and causes the same to trip the loop 30 from engagement with the said tooth 29, the said cable being drawn back to its original position as shown in Figs. 5 and 6 under the ensuing power stroke of the plunger and feeder operating bar 49. All subsequent operations are repetitions of those described.

It will be noted that the shaft of the feeder and the lower end of the latter always occupy a position below the top of the baling case and because of this forms an abutment for the upper end of the bale in the event that it bulges backward upon the withdrawal of the plunger and incidentally acts as a folder for the baling material so that the upper edge or corner of the bale shall be comparatively smooth and even. It will also be apparent by reference to Figs. 2 and 3 that the feeder is capable of yielding upwardly in the event that it cannot make its full downward stroke because of the resistance of an overcharge of baling material, this yielding of the feeder reducing chance of injury from the cause named to the minimum.

From the above description it will be apparent that I have produced a baling press embodying the features of advantage enumerated and I wish it to be understood that I do not desire to be restricted to the exact details of construction shown and described as obvious modifications will suggest themselves to one skilled in the art.

Having thus described the invention what I claim as new and desire to secure by Letters-Patent, is:—

1. In a baling press, the combination of a baling case, having a feed opening in its upper side and a hopper communicating with the feed opening, and a feeder for forcing baling material from the hopper down into the baling case consisting of a transverse shaft suitably journaled and capable of moving up and down bodily, a feeder secured rigidly thereto, and means for holding the feeder yieldingly elevated.

2. In a baling press, the combination of a baling case, having a feed opening in its upper side and a hopper communicating with the feed opening, and a feeder mechanism for forcing baling material from the hopper down into the baling case consisting of a transverse shaft suitably journaled and capable of moving up and down bodily, a feeder secured rigidly thereto, means for holding the feeder yieldingly elevated, and means for overcoming the resistance of said yielding means and causing the feeder to swing down into the feed opening.

3. In a baling press, the combination of a baling chamber, having a feed opening in its upper side, a hopper to deliver baling material to said feed opening, and a feeder mechanism comprising a transverse shaft extending across the feed opening at one end, a feeder secured to said shaft, a spring normally holding the feeder elevated, a plunger in the baling case, means for actuating the same, and means for swinging the feeder downward shortly after the movement of the plunger begins until it overlies the plunger.

4. In a baling press, the combination of a baling chamber, having a feed opening in its upper side, a hopper to deliver baling material to said feed opening, and a feeder mechanism comprising a transverse shaft extending across the feed opening at one end, a feeder secured to said shaft, a spring normally holding the feeder elevated, a plunger in the baling case, means for actuating the same, means for swinging the feeder downward shortly after the movement of the plunger begins until it overlies the plunger, and means for maintaining the feeder in its depressed position for the major portion of the stroke of the plunger and then releasing it.

5. In a baling press, the combination of a baling case, having a feed opening in its upper side, and a hopper communicating with the feed opening, and a feeder mechanism for forcing baling material from the hopper down into the baling case consisting of a transverse shaft suitably journaled, a feeder secured rigidly thereto, a crank arm mounted on the shaft and capable of turning thereon a suitable distance, and a spring for holding the feeder yieldingly elevated.

6. In a baling press, the combination of a baling case, having a feed opening in its upper side, and a hopper communicating with the feed opening, and a feeder mechanism for forcing baling material from the hopper down into the baling case consisting of a transverse shaft suitably journaled, a feeder secured rigidly thereto, a crank arm mounted on the shaft and capable of turning thereon a suitable distance, a spring for holding the feeder yieldingly elevated, and a reciprocating bar adapted when moving in one direction to engage said crank arm and turn the same and the shaft to depress the feeder and provided with a longitudinal rib to maintain the crank arm and the shaft of the feeder with the latter depressed, for the major portion of the stroke of said bar.

7. In a baling press, the combination of a baling case having a feed opening in its upper side, and a hopper communicating with the feed opening, and a feeder mechanism for forcing baling material from the hopper down into the baling case consisting of a transverse shaft suitably journaled, a feeder secured rigidly thereto, a crank arm mounted on the shaft and capable of turning thereon a suitable distance, a spring for holding the feeder yieldingly elevated, and a reciprocating bar adapted when moving in one direction to engage said crank arm and turn the same and the shaft to depress the feeder and provided with a longitudinal rib to maintain the crank arm and the shaft of the feeder with the latter depressed for the major portion of the stroke of said bar and with an opening rearward of said rib in the vertical plane of said arm to permit the arm to swing downward also after it becomes disengaged from said rib.

8. In a baling press, a baling case, having a feed opening in its upper side and a hopper to deliver to the feed opening, a feeder mechanism arranged to swing downward into the hopper, a spring to hold the feeder yieldingly elevated, a crank arm movable with the feeder, a reciprocatory bar suitably guided and provided with a cam end to engage the crank arm, a rib to hold the crank arm elevated at times and an opening to permit the crank arm to swing downward after the rib passes rearwardly beyond the crank arm, a shaft, a plunger, means for operating the shaft, and connections between the shaft and the plunger and reciprocatory bar to cause the plunger and bar to move rearwardly to compress the baling material and depress the feeder respectively.

9. In a baling press, a baling case, having a feed opening in its upper side and a hopper to deliver baling material to the feed opening, a feeder mechanism arranged to swing downward into the hopper, a spring to hold the feeder yieldingly elevated, a crank arm movable with the feeder, a reciprocatory bar suitably guided and provided with a cam end to engage the crank arm, a rib to hold the crank arm elevated at times and an opening to permit the crank arm to swing downward after the rib passes rearwardly beyond the crank arm, a shaft, a plunger, means for operating the shaft, connections between the shaft and the plunger and reciprocatory bar to cause the plunger and bar to move rearwardly to compress the baling material and depress the feeder respectively, and means for automatically effecting the reverse operation of said shaft and consequently the withdrawal movement of the plunger and said reciprocatory bar.

10. In a baling press, a baling case, having a feed opening in its upper side and a hopper to deliver baling material to the feed opening, a feeder arranged to swing downward into the hopper, a spring to hold the feeder yieldingly elevated, a crank arm movable with the feeder, a reciprocatory bar suitably guided and provided with a cam end to engage the crank arm, a rib to hold the crank arm elevated at times and an opening to permit the crank arm to swing downward after the rib passes rearwardly beyond the crank arm, a shaft, a plunger, means for operating the shaft, connections between the shaft and the plunger and reciprocatory bar to cause the plunger and bar to move rearwardly to compress the baling material and depress the feeder respectively, a rotary wheel provided with teeth, an angle lever pivoted to the wheel ahead of the teeth, a loop adapted to be engaged by the teeth in the rotation of said wheel and to rest upon said angle lever, and a flexible connection attached at its front end to said loop and connected at its rear end to said shaft to effect the withdrawal of the plunger and the said reciprocatory bar.

11. In a baling press, a baling case, having a feed opening in its upper side and a hopper to deliver baling material to the feed opening, a feeder arranged to swing downward into the hopper, a spring to hold the feeder yieldingly elevated, a crank arm movable with the feeder, a reciprocatory bar suitably guided and provided with a cam end to engage the crank arm, a rib to hold the crank arm elevated at times and an opening to permit the crank arm to swing downward after the rib passes rearwardly beyond the crank arm, a shaft, a plunger, means for operating the shaft, a connection between the shaft and the plunger and reciprocatory bar to cause the plunger and bar to move rearwardly to compress the baling material and depress the feeder respectively, a rotary wheel provided with teeth, an angle lever pivoted to the wheel ahead of the teeth, a loop adapted to be engaged by the teeth in the rotation of said wheel and to rest upon said angle lever, a flexible connection attached at its front end to said loop and connected at its rear end to said shaft to effect the withdrawal of the plunger and said reciprocatory bar, and mean for operating the lever and causing the same to trip the loop from the teeth as the recoil movement of the plunger and said bar terminates.

In testimony whereof I affix my signature, in the presence of two witnesses.

SAMUEL G. GILLELAND.

Witnesses:
H. C. RODGERS,
G. Y. THORPE.